A
United States Patent [19]
Pulley

[11] 3,800,047
[45] Mar. 26, 1974

[54] PROCESS FOR PRODUCING DEHYDRATED POTATO PRODUCTS FORTIFIED WITH STABLE VITAMIN C

[75] Inventor: Arden O. Pulley, Blackfoot, Idaho

[73] Assignee: American Potato Company, San Francisco, Calif.

[22] Filed: Oct. 21, 1971

[21] Appl. No.: 191,335

[52] U.S. Cl.............. 426/302, 426/311, 426/328, 426/456, 426/167, 426/72
[51] Int. Cl............................................. A23l 1/12
[58] Field of Search.......... 99/100 P, 104, 207, 154, 99/168, 11; 252/404; 424/175, 280

[56] References Cited
UNITED STATES PATENTS

| | | | |
|---|---|---|---|
| 2,980,543 | 4/1961 | Hall | 99/207 |
| 3,027,264 | 3/1962 | Iriniter | 99/207 |
| 2,583,686 | 1/1952 | La Mont | 99/156 |
| 2,572,761 | 10/1951 | Revoche | 99/207 |
| 2,572,762 | 10/1951 | Rwache | 99/207 |
| 2,681,285 | 6/1954 | Hendel | 99/207 |
| 2,709,657 | 5/1955 | Campbell | 99/207 |

*Primary Examiner*—Norman Yudkoff
*Assistant Examiner*—Martin G. Mullen
*Attorney, Agent, or Firm*—Robert M. Stephenson

[57] ABSTRACT

Dehydrated potato products are coated with a water solution comprising ascorbic acid or its salts, a film forming oxygen barrier, and sulfur dioxide. Upon storage in air, treated products do not discolor and vitamin activity is protected.

4 Claims, No Drawings

PROCESS FOR PRODUCING DEHYDRATED POTATO PRODUCTS FORTIFIED WITH STABLE VITAMIN C

BACKGROUND OF THE INVENTION

1. Field of the Invention

The invention relates to stabilizing vitamin C to prevent normal discoloration and loss of vitamin activity. In particular, the invention relates to stabilizing vitamin C for fortifying dehydrated potato products.

2. Description of the Prior Art

Potato granules, a form of dehydrated instant mashed potatoes have heretofore been fortified with vitamin C and other vitamins for Armed Forces, school lunch programs, and other commercial uses for many years. Such potato granule products are about −80 mesh, have a moisture content of about 7 percent, and are packed in inert atmosphere of less than 2 percent oxygen in hermetically sealed tins. The vitamin supplement is added in approximately the same particle size as the potato granules. Such a product is known to have good storage stability in that it is not normally subject to discoloration or loss of vitamin C activity. The bulk of dehydrated instant mashed products sold in retail markets, however, are large particles such as potato flakes, agglomerates, and Potato Buds. These products are conventionally air packed in containers which are permeable to both oxygen and moisture vapor and are susceptible to moisture absorption during storage at high relative humidity, often reaching a moisture level of 9 percent or higher. When vitamin C in granular form is added to such products, segregation occurs, resulting in unequal vitamin distribution. When vitamin C is finely powdered to a particle size of about −200 mesh or finer, so the surfaces can be uniformly dusted, the dusted product turns pink and brown more rapidly upon storage. Adherence improves and discoloration increases as particle size decreases. The discoloration is more rapid as moisture content increases during storage. If the vitamin C is incorporated during processing, the dried product discoloration is accelerated in storage. U.S. Pat. No. 3,027,264 discloses a process for fortifying potato flakes with vitamin C in which a mixture of vitamin C and sulfite is added into the mash at a separate point to prevent interaction with anti-oxidants and emulsifiers thereby improving flavor, texture and shelf life of the product dried to 5.5 percent moisture.

Currently there is emphasis on selling more nutritious dehydrated foods containing at least as much vitamin C as was present in the raw food prior to processing and in some cases with added vitamins to supply a significant part of the daily requirement. The prior art does not disclose any method for uniformly fortifying dehydrated potato products with vitamin C without serious discoloration occurring during storage unless moisture content is kept low and packaging is in an inert atmosphere.

SUMMARY OF THE INVENTION

When dehydrated potato products are sprayed with a solution of vitamin C or vitamin C is added before dehydration, a pink color often develops in a week or two at room temperature storage in air. The discoloration then assumes a brownish cast and in two to six months has progressed to an unacceptable brown color. Incorporation of a reducing agent, such as a sulfite salt in acceptable concentrations, along with the vitamin C has a slight beneficial effect but discoloration is not totally inhibited. The combination of a viscous but nonhydroscopic solution of a film-forming oxygen barrier, such as maltodextrin with vitamin C, is not effective in preventing discoloration. However, it has now been found that when a high solids mixture of vitamin C with sulfite salts (or other sources of active sulfur dioxide) and a film forming oxygen barrier such as light yellow corn dextrin is sprayed on the surface, neither pink nor brown discoloration occurs, even after long storage. In addition, vitamin C activity is preserved. Furthermore, any discoloration of vitamin C normally resulting from the presence of even trace amounts of iron is obviated by this invention. High viscosity, but low solids mixtures of starches and gums, when incorporated with sulfites and vitamin C, are not effective. Other reducing agents, such as stannous chloride, likewise, are not effective. Complete protection against discoloration of vitamin C requires not only the combination of sulfite salts and viscous non-tacky film-forming agents such as maltodextrin, but a concentration of maltodextrin in excess of about 10 percent. Although partial protection can be obtained at lower concentrations, undesirable yellow discoloration still occurs. When the concentration of maltodextrin (or its equivalent) is about 40 percent, discoloration is completely prevented.

DESCRIPTION OF THE PREFERRED EMBODIMENTS

In arriving at the following preferred embodiments, many tests were conducted in efforts to incorporate vitamin C with dehydrated potato products in such a way as to prevent pink and brown discoloration in storage.

All dehydrated potato products sprayed with a concentrated solution of only vitamin C to impart 160 mg/100 g product developed in 1–2 weeks a pink color, which gradually turned brown over a period of 2–6 months. Likewise, when vitamin C was incorporated as an additive during the production of potato granules, Potato Buds, or extruded hashbrowns, the undesirable color develops during storage.

When finely ground ascorbic acid powder was dusted onto the surface of dehydrated potato products and then exposed at 70 percent relative humidity and 70°F, moisture increased, and similar discoloration occurred during storage; however, if the normal moisture content of about 6 to 8 percent is maintained and the product is stored in inert gas, discoloration does not occur.

It appears that a solution of high viscosity and high solids is required for optimum protection of the vitamin C. One skilled in the art would expect many food substances with these characteristics to be effective. It appears from testing that useful components must not retrograde or form a gel and must not be sticky. When dextrins such as maltodextrin are applied as a water soluble coating in combination with vitamin C and sulfite salts, and dried as a film, it appears that oxygen is excluded, thereby protecting the vitamin C component against oxidation and discoloration. Many starch-derived products appear to have these required characteristics. Thus, such products as British gum, 85-Fluidity thin boiling waxy maize starch and hypochlorite oxidized starch are useful. Other useful products include gelatin, gum arabic, gum tragacanth, carboxymethylcellulose and ethoxycellulose, each of which can be prepared in a concentrated solution which is moderately viscous.

Tests indicate that ascorbic acid (vitamin C), or soluble salts of ascorbic acid, such as sodium ascorbate, are equally protected by the invention. In this application, the term "vitamin C" includes all such compounds with vitamin C activity.

Iron ions catalyze discoloration of vitamin C. Since small quantities of iron are present in potatoes and since iron is often added to supplement the nutritive value of foods, it is necessary to suppress this reaction. Tests have shown that the invention was equally effective in stabilizing the color of vitamin C even in the presence of iron ions. It is well known that iron in the presence of vitamin C results in much greater discoloration than vitamin C alone.

By using a concentrated solution, the desired amount of vitamin C can be applied to products without incorporating sufficient moisture to require a subsequent drying step, although additional drying can be done if desired.

EXAMPLE 1

Potato Buds (registered trademark), a dehydrated instant mashed potato product produced as disclosed in U.S. Pat. No. 3,407,080 with a particle size of about −3+8 mesh was sprayed with various solutions to add vitamin C at a concentration of 80-160 mg/100 g Potato Buds. (A one-half cup serving of mashed potatoes made from the dehydrated product, fortified to contain 160 mg vitamin C/100 g, constitutes 100 percent of the minimum daily requirement of vitamin C for children 12 years of age and under, or 2/3 the minimum daily requirement for adults).

Potato Buds, with solutions indicated in Table 1 below, were stored 4 months at 70°F at 70 percent relative humidity. Evaluations after 4 months storage indicated that a concentrated solution of maltodextrin was required in the presence of sulfite and vitamin C in order to get protection from discoloration. Sulfite alone with vitamin C decreased discoloration somewhat but was unacceptable. Sulfite with 10 percent maltodextrin resulted in slight yellowing which had marginal acceptability.

TABLE 1

Composition of Spray Solution

| Test | Vitamin C (as sodium ascorbate) | Maltodextrin | Sodium Bisulfite | Appearance After Storage |
|---|---|---|---|---|
| 1 (Control) | 0 | 0 | 0 | Light uniform color |
| 2 | 8% | 10% | 5% | Yellow spots |
| 3 | 16% | 0 | 5% | Brown spots* |
| 4 | 16% | 0 | 0 | Brown spots* |
| 5 | 14% | 40% | 2.2% | Light uniform color |

*Unacceptable

EXAMPLE 2

A second series using the procedure of Example 1 was run varying the concentration of maltodextrin in the spray solution. Viscosities were run on spray solutions. Protection from discoloration was evaluated using an accelerated test in which moisture contents were adjusted in the range of 9 to 10 percent and the products were held in sealed bottles at 140°F for 40 hours.

TABLE 2

| Test | Maltodextrin** | Vitamin C (as sodium ascorbate) | Sodium Bisulfite | Viscosity* | Protection |
|---|---|---|---|---|---|
| 5 | 20% | 20% | 2.9 | 85.7 | Partial |
| 6 | 20% | 14 | 2.2 | 84.6 | Partial |
| 7 | 30 | 20 | 2.9 | 204.3 | Partial |
| 8 | 30 | 14 | 2.2 | 145.5 | Partial |
| 9 | 40 | 20 | 2.9 | 1824.4 | Complete |
| 10 | 40 | 14 | 2.2 | 443.0 | Complete |

*Values are centipoises measured with Model LVT Brookfield Viscometer at 22°C., Spindle Nos. 1 and 2, 0.3–60 rpm.
**Dextrose Equivalent of 10

This series shows that the 40 percent maltodextrin spray formulation was superior to 30 percent or 20 percent maltodextrin at all vitamin C and sulfite levels tested. Products sprayed with 20 to 30 percent maltodextrin formulations discolored somewhat and were less desirable in appearance at the end of the storage period. Viscosities are greatly affected by the vitamin C and sulfite in the solution. Viscosities for 20, 30, and 40 percent maltodextrin alone were 8.6, 14.6, and 121.4 cps respectively. The upper limit of viscosity is limited only by the ability to apply the solution as a spray.

EXAMPLE 3

Tests were conducted in which commercial potato flakes, potato agglomerates, and dehydrated hash-brown strips were treated in the same manner as Test No. 10 of Example 2. The treated products were exposed to the accelerated test disclosed in Example 2. Protection from discoloration was complete in all cases.

The discoloration problem associated with vitamin C addition is not confined to potato products. This would indicate that the problem is a function of the vitamin C itself and not of the product tested. The synergistic mixture, when dry, apparently protects the vitamin C from oxidation or other changes which result in the common pink-brown color formation. This theory appears to be confirmed by tests in which pure sodium ascorbate was adjusted in moisture content to 9–10 percent and stored under the accelerated conditions outlined in Example 2. The product turned brown overnight when stored in a sealed bottle at 140°F. The synergistic mixture of Example 2, Test 10 when dried and then adjusted to 9–10 percent moisture, did not develop the brown color under the same storage conditions.

What is claimed is:

1. A process for producing dehydrated potato products fortified with vitamin C at a concentration of 80–160 mg/100 g potato product, said vitamin C being color stable even in the presence of air, iron ions, or high humidity comprising the steps of:
   a. forming a water solution comprising a food substance film-forming oxygen barrier selected from a group consisting of British gum, 85 Fluidity thin boiling waxy maize starch, hypochlorite oxidized starch, maltodextrin, gelatin, gum arabic, gum tragacanth, carboxymethyl cellulose and ethoxycellulose present in the concentration of 10 to 40 percent by weight, vitamin C in the concentration of 14 to 20 percent by weight and a source of active sulfur dioxide; and b. spraying said solution on the surfaces of said dehydrated potato products.

2. The process of claim 1 further characterized by drying said sprayed surfaces to remove at least in part said water from said sprayed solution.

3. The process of claim 1 in which said dehydrated potato products are selected from a group of dehydrated potato products of large particle size consisting of potato flakes, hashbrown strips, and agglomerates.

4. The process of claim 1 in which said solution comprises 8 to 20 percent by weight vitamin C, 2.2 to 5.0 percent by weight sulfite salt, and 10 to 40 percent by weight of said film-forming oxygen barrier.

* * * * *